Feb. 10, 1953 R. R. BALAGUER 2,628,261
DRY ELECTRIC BATTERY
Filed Oct. 28, 1950
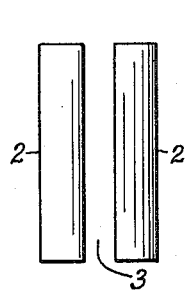
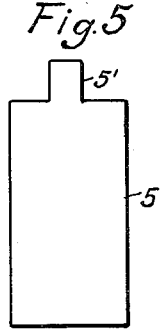
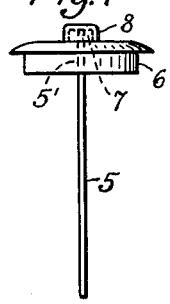
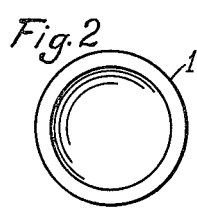
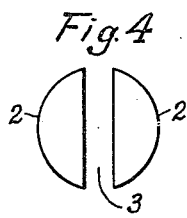
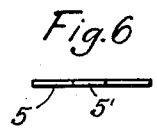
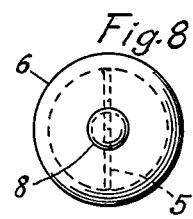
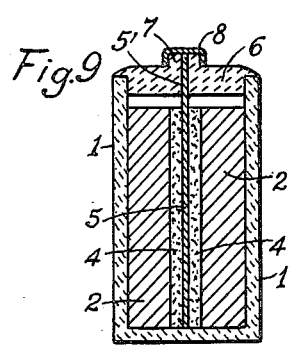
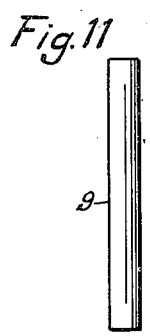
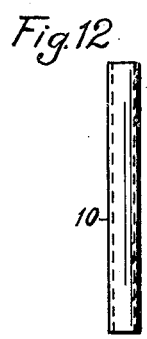
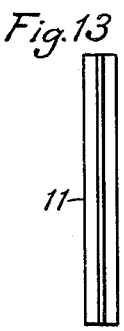
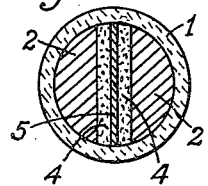
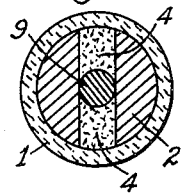
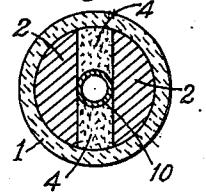
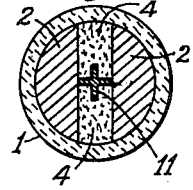
INVENTOR:
Rodolfo Rodriguez Balaguer,
BY Singer, Stern & Carlberg
ATTORNEYS.

Patented Feb. 10, 1953

2,628,261

UNITED STATES PATENT OFFICE 2,628,261

DRY ELECTRIC BATTERY

Rodolfo Rodriguez Balaguer,
Union de Reyes, Cuba

Application October 28, 1950, Serial No. 192,660
In Cuba May 19, 1950

1 Claim. (Cl. 136—103)

This invention relates to dry electric batteries, and it has for its object to provide an improved dry electric battery comprising the usual elements, i. e. carbon or positive pole of the battery, electrolytic porous material, electrolytic depolarizing mixture, and zinc or negative pole, but arranged reversely to the elements of the dry electric batteries at present manufactured. In fact, this improved dry electric battery includes an outer carbon or graphite thick container or vessel forming the electric-current positive collector, a depolarizing mixture molded into two solid portions having a cross-section in the shape of a circular segment and fitting within the outer vessel to contact the cylindrical wall and bottom portions thereof and spaced apart by a broad slot, a stuffing of wheat starch admixed with an electrolyte such as ammonia chloride and occupying the slot between the two portions of the depolarizing mixture, and a zinc sheet vertically inserted into the middle plane of said slot across said stuffing and connected to the plastic cover that seals the carbon vessel and ends in a metallic ferrule forming the battery contact. By virtue of the stated arrangement, this improved battery is free from corrosion and electrolyte leakages and has the additional advantages that its polarizing effect is smaller than in the usual dry batteries, that the carbon forming the outer vessel constitutes an absorber for the gases issuing during the battery discharge, and that the amount of zinc contained in the battery is only the volume that is to be consumed during the electrolytic process of the battery, whereupon this battery has a more constant voltage and is more economical to manufacture than the dry electric batteries heretofore used.

The invention is described with reference to the figures of the accompanying drawing, of which:

Fig. 1 is an outer elevational view of the carbon vessel forming the battery container and positive pole of the battery.

Fig. 2 is a top plan view of same.

Fig. 3 is an outer elevational view of the two depolarizing mixture portions each having a cross-section in the shape of a circular segment in vertical and spaced apart arrangement.

Fig. 4 is a top plan view of the two depolarizing mixture portions spaced apart by an open space.

Fig. 5 is a front elevational outer view of the zinc sheet forming the negative pole of the battery.

Fig. 6 is an edge view of the same sheet.

Fig. 7 is a side elevational view of the zinc sheet connected to the sealing cover and to the ferrule forming the battery contact.

Fig. 8 is a top plan view of the cover and contact ferrule.

Fig. 9 is a diametral vertical section of the assembled battery showing in position its various elements.

Fig. 10 is a cross-section view through the depolarizing mixture portions and vessel shown in Fig. 9.

Figs. 11, 12 and 13 are elevational views of modified forms of the zinc element forming the negative pole of the battery.

Figs. 14, 15 and 16 are cross-section views similar to that of Fig. 9, showing inserted as negative pole the modified forms of the zinc element represented in Figs. 11, 12 and 13 respectively.

The dry electric battery of this invention is composed of an outer carbon or graphite which vessel or container 1 forms the positive collector of electric current or positive pole of the battery. Within the outer vessel 1 is fitted the depolarizing mixture divided into two solid portions 2 having a cross-section in the shape of a circular segment, which portions are of less height than the cylindrical wall of vessel 1 and are in contact with said cylindrical wall and with the vessel bottom, thereby allowing an open space or slot 3. This slot 3 is adapted to contain the starch paste impregnated with an electrolyte such as ammonia chloride to form a stuffing 4 within said slot 3. Said stuffing has inserted therein a zinc metallic sheet 5 forming the negative pole of the battery, which extends to a level above the outer edge of the vessel 1 and ends in a lug or narrow extension 5' inserted within the plastic cover 6 serving to seal the vessel 1 on top and having a central cylindrical pinnacle 7 which is covered by a metallic ferrule 8 in contact with the top end of the lug 5' and forming the outer contact for the electric battery, a tight sealing being formed between the cover 6 and the upper edge of carbon vessel 1 through a layer of synthetic cement.

The shape of the zinc or negative element of the battery may differ from those illustrated in Figs. 5 and 6 of the drawing. In Fig. 11 is illustrated a modified form of said negative element which consists in a cylindrical bar 9 inserted into the central portion of the electrolytic starch stuffing 4 occupying the slot 3 and being of a diameter nearly equal to the width of said slot 3. In Fig. 12 is illustrated another modified form of the negative element of the battery, which consists in a zinc tube 10 being inserted into the central portion of the stuffing 4. In Fig. 13 is illustrated a further modified form of the battery negative element consisting in a four-wing bar 11 which is likewise inserted into the central portion of the stuffing 4 as indicated in Fig. 16 of the drawing.

Instead of the container 1 being cylindrical, the same may be in a parallelopiped shape of square or polygonal section, in which case the shape of the spaced apart portions 2 of the depolarizing mixture must be altered correspondingly.

The electric battery of this invention affords the following advantages: (1) By making the outer vessel from carbon or graphite, a very important improvement of the battery is attained, for, because of the carbon being unlikely to be affected by the chemical elements of the battery, it is completely impossible for the battery to be corroded after use or storage and thereby a leakage of the electrolyte contained therein, and therefore the battery will never damage a flashlight, radio set, etc., whatever may be the discharge regime of the battery or the time since it was manufactured. (2) Inasmuch as the carbon or positive element of the battery has a greater surface in contact with the solid depolarizing mixture than in the batteries heretofore used, the polarizing effect is smaller, that is, that the battery voltage under discharge is maintained constant for a greater period of time. (3) Inasmuch as the carbon contained in the outer vessel or container is of a porous nature, the same will absorb a portion of the hydrogen generated during the battery discharge, and as the vessel wall is in direct contact with the atmosphere, it allows a portion of such hydrogen to issue to the outside, thereby doing away with the necessity of protecting the carbon vessel with an absorbing material or with an insulating cover, it being also unnecessary to provide a space for accumulation of the gases during the battery discharge. (4) The carbon contained in the battery has a dual purpose, i. e.: to serve as a container and to serve as positive pole for the battery, whereby the positive pole is localized throughout the peripherial and bottom portions of the battery and its whole inner surface is in contact with the solid depolarizing mixture, and as the carbon is resistant to the battery electro-chemical process, the same does not waste away, the zinc being the one element that will be wasted. Even after discharge of the battery, the carbon vessel can be re-used as many times as desired. Besides, because of the carbon surface of this battery being greater than in the usual batteries, the positive collector of the current is correspondingly increased, whereby the hydrogen accumulated at its walls during the discharge process is of a smaller density than in any other dry electric battery structure, and consequently, this battery tends to maintain the voltage more constant during the discharge process, that is, same has a smaller polarization effect. (5) Inasmuch as the zinc element is arranged within a slot in the solid depolarizing mixture of the battery, and at the central portion of said slot, upon the battery being discharged, it is the zinc that is consumed and as the same is retained within the depolarizing mixture, there will be no leakage or escape of electrolyte from the battery to the outside. Said negative element must only have the exact volume of zinc to be consumed during the electrolytic process, for that is the sole purpose of the zinc in this battery, and not to serve as a container.

It is obvious that changes may be made in the nature of the depolarizing mixture and of the electrolytic stuffing inserted within the slot splitting the two solid depolarizing mixture portions, as well as in the shape of the electrolytic stuffing, without thereby altering the essential character of the invention which is such as claimed hereinafter.

What I claim is:

A dry electric battery comprising an outer carbon container forming the positive pole of the battery and having a bottom integral therewith, two solid portions of depolarizing material, each having a circular segment cross-section and a vertical face, both portions being in contact with the inner surface of the cylindrical wall and the bottom of the outer container and spaced apart, forming therebetween an open space between said vertical faces, an electrolytic stuffing lodged within said space, a vertical zinc sheet inserted in the center of said stuffing to form the negative pole of the battery in a position parallel to the plane vertical faces of the two portions of the depolarizing material, the upper end of said sheet extending slightly above the level of the top edge of the container, a plastic cover obturating and sealing the top opening of said container and apertured to receive the upper end extension of the zinc sheet, and a metallic ferrule secured to the upper end of the zinc extension above the cover to form the outer negative contact of the battery.

RODOLFO RODRIGUEZ BALAGUER.

REFERENCES CITED

The following references are of record in the file of this patent:

UNITED STATES PATENTS

| Number | Name | Date |
| --- | --- | --- |
| 1,258,257 | Sangers | Mar. 5, 1918 |
| 1,266,166 | Sangers | May 14, 1918 |
| 1,267,349 | Smith | May 21, 1918 |
| 1,286,750 | Palmer | Dec. 3, 1918 |
| 1,445,503 | Fuller | Feb. 13, 1923 |

FOREIGN PATENTS

| Number | Country | Date |
| --- | --- | --- |
| 18,754 | Great Britain | of 1899 |